(12) United States Patent
Shen

(10) Patent No.: US 6,590,868 B2
(45) Date of Patent: Jul. 8, 2003

(54) METHOD AND APPARATUS FOR RESTART COMMUNICATION BETWEEN NETWORK ELEMENTS

(75) Inventor: Naiming Shen, San Jose, CA (US)

(73) Assignee: Redback Networks Inc., San Jose, CA (US)

(*) Notice: Subject to any disclaimer, the term of this patent is extended or adjusted under 35 U.S.C. 154(b) by 0 days.

(21) Appl. No.: 09/873,037

(22) Filed: Jun. 2, 2001

(65) Prior Publication Data

US 2002/0181409 A1 Dec. 5, 2002

(51) Int. Cl.$^7$ .................................................. H04J 3/14
(52) U.S. Cl. ...................... 370/242; 370/243; 370/244
(58) Field of Search ................................ 370/242, 243, 370/244, 245, 389, 390, 396, 395.2, 395.3, 395.31, 395.4, 401

(56) References Cited

U.S. PATENT DOCUMENTS

| 4,667,324 | A |   | 5/1987  | Graves       |         |
|-----------|---|---|---------|--------------|---------|
| 4,736,363 | A |   | 4/1988  | Aubin et al. |         |
| 5,159,595 | A |   | 10/1992 | Flanagan et al. |      |
| 5,473,599 | A | * | 12/1995 | Li et al. ..................... | 370/219 |
| 5,519,704 | A | * | 5/1996  | Farinacci et al. ........... | 370/402 |
| 5,608,733 | A |   | 3/1997  | Vallee et al. |        |
| 5,699,351 | A | * | 12/1997 | Gregerson et al. ..... | 340/825.02 |
| 6,205,142 | B1 |  | 3/2001  | Vallee |              |
| 6,229,819 | B1 | * | 5/2001 | Darland et al. ............. | 370/467 |

OTHER PUBLICATIONS

ISO/IEC Joint Technology Committee, ISO/IEC 10589, Apr. 30, 1992, ISO/IEC Copyright Office.*
D. Oran, RFC 1142 OSI IS–IS Intra–Domain Routing Protocol, Feb. 1990, Network Working Group.*
P.K. JHA, "Bandwidth Maximization for SONET/SDH and Direct Data over Optical Networks," http://www.isoc.org/inet2000/cdproceedings/1g/1g_3.htm, pp. 1–26, Nov. 16, 2000.

* cited by examiner

*Primary Examiner*—Wellington Chin
*Assistant Examiner*—William Schultz
(74) *Attorney, Agent, or Firm*—Blakely, Sokoloff, Taylor & Zafman LLP

(57) ABSTRACT

A method and apparatus for the restart communication between network elements are described. In one embodiment, a method for restarting communication between a first network element and a second network element in a network comprises transmitting a modified hello packet to the second network element. The modified hello packet includes a time value that is greater than a time value of a hello packet that was transmitted to the second network element prior to International-System-International-System (IS-IS) network communications in the first network element becoming non-operational. The method also including updating routing information within the first network element through transmission of Complete Sequence Number Packets of the IS-IS standard to the second network element, independent of tearing down a communication link between the first network element and the second network element after IS-IS network communications in the first network element have become non-operational.

16 Claims, 9 Drawing Sheets

METHOD AND APPARATUS FOR RESTART COMMUNICATION BETWEEN NETWORK ELEMENTS

FIELD OF THE INVENTION

The invention relates to the field of communications. More specifically, the invention relates to a method and apparatus for restart communication between network elements.

BACKGROUND OF THE INVENTION

Communication networks are generally comprised of two or more individual network elements, such as a router or switch, coupled together. Network elements generally contain a number of line cards and control cards that are used to transmit data through the network element. The line cards and control cards generally contain a number of circuits to control the transmission of such data.

International-System-International-System ("IS-IS") is a link state interior gateway protocol originally developed for routing ISO/CLNP ("International Organization for Standardization/Connectionless Network Protocol") packets among network elements. IS-IS is used to control routing in some networks, and can use a 'shortest path first' algorithm for determining a particular data route within the network. In particular, network elements typically employ the IS-IS standard to communicate their routing information among one another. Several types of network configurations are supported by IS-IS, e.g., broadcast (network elements are coupled to a single connection medium, such as an Ethernet connection), and point-to-point (network elements are connected to one another directly).

The IS-IS standard utilizes several different types of data packets for the transmission of routing information. For example, hello packets ("IIHs") are used to establish and maintain neighbor adjacency between two network elements. Complete sequence number packets ("CSNPs") contain sequence numbers of all routing information of a network so that an individual network element can determine whether it needs to update its own internal 'picture' of the network. Partial sequence number packets ("PSNPs") contain the sequence numbers for the routing information for one particular network element. Link state packets ("LSPs") contain the actual routing information for a particular network element, i.e., to what other network element(s) or network(s) that it is connected.

Also, 'hello' packets or 'heartbeat' messages are typically sent at regular intervals by network elements to other network elements to tell the recipient network elements that the sending network element is still operational. The recipient network element then expects to receive another 'hello' packet from the sender within the same period of time (which is adjustable). If these 'hello' packets are not received within the time period set, the recipient assumes that the transmitting network element is non-operational for purposes of routing data and accordingly, tears down the communication link between itself and the transmitting network element. Once the transmitting and recipient network element are again able to communicate the communication link between the two must be reconstructed. Moreover, once the communication link is reestablished, the two network elements typically exchange routing information in order to ensure that such information is up-to-date. Disadvantageously, this process of tearing down a communication link, establishing a new communication link and exchanging routing information between the two network elements can be time consuming, thereby potentially causing the loss of data packets within the network that could be transmitted between the two network elements.

SUMMARY OF THE INVENTION

A method and apparatus for the restart communication between network elements are described. In one embodiment, a method for restarting communication between a first network element and a second network element in a network comprises transmitting a modified hello packet to the second network element. The modified hello packet includes a time value that is greater than a time value of a hello packet that was transmitted to the second network element prior to International-System-International-System (IS-IS) network communications in the first network element becoming non-operational. The method also including updating routing information within the first network element through transmission of Complete Sequence Number Packets of the IS-IS standard to the second network element, independent of tearing down a communication link between the first network element and the second network element after IS-IS network communications in the first network element have become non-operational.

In an embodiment, a network element includes a memory. Additionally, the network element includes a heartbeat unit coupled to the memory. The heartbeat unit is to transmit a modified heartbeat packet to a different network element in a network. The modified heartbeat packet is to be stored in the memory and is to include a time value that is greater than a time value of a heartbeat packet that is to be transmitted to the different network element prior to International-System-International-System (IS-IS) network communications in the network element becoming non-operational. The network element also includes a reinitialize unit coupled to the heartbeat unit. The reinitialize unit is to update routing information within the network element through transmission of Complete Sequence Number Packets of the International-System-International-System (IS-IS) standard to the different network element, independent of tearing down a communication link between the network element and the different network element after IS-IS network communications the network element have become non-operational.

BRIEF DESCRIPTION OF THE DRAWINGS

Embodiments of the invention may be best understood by referring to the following description and accompanying drawings that illustrate such embodiments. The numbering scheme for the Figures included herein are such that the leading number for a given element in a Figure is associated with the number of the Figure. For example, network 100 can be located in FIG. 1. However, element numbers are the same for those elements that are the same across different Figures.

In the drawings.

DETAILED DESCRIPTION

A method and apparatus for the restart communication between network elements are described. In the following description, for purposes of explanation, numerous specific details are set forth in order to provide a thorough understanding of the present invention. It will be evident, however, to one skilled in the art that the present invention may be practiced without these specific details.

System Description

Figure 1:
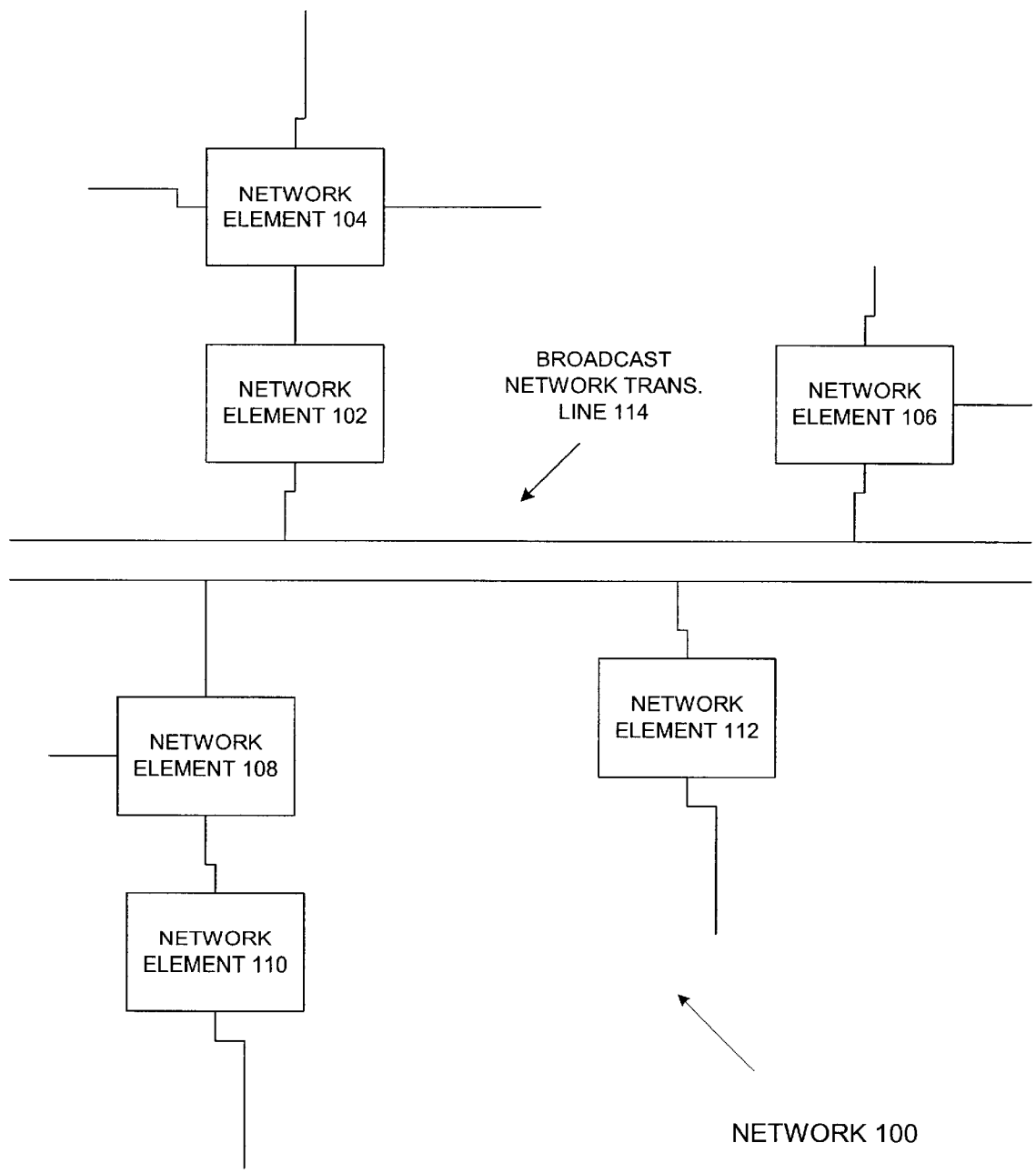
FIG. 1 is a block diagram illustrating an embodiment of a broadcast network configuration that incorporates embodiments of the present invention.

FIG. 1 is a block diagram illustrating an embodiment of a broadcast network configuration that incorporates embodiments of the present invention. In particular, FIG. 1 illustrates network 100 that includes broadcast network transmission line 114, network element 102, network element 106, network element 108, and network element 112 such that network elements 102, 106, 108, and 112 are coupled together via connection to broadcast network transmission line 114, according to embodiments of the present invention. Network element 104 and network element 110 are coupled to network elements 102 and 108, respectively. In an embodiment, network elements 102–112 can be routers, switches, bridges, or other types of network elements that switch data across a network. In another embodiment, network 100 is a system in which network elements 102–112 share routing information using the IS-IS standard. In a further embodiment, network elements 102–112 are coupled to other network elements that may or may not be coupled to broadcast network transmission line 114.

In an embodiment, broadcast network transmission line 114 employs the Ethernet standard. However, embodiments of the present invention are not so limited. Examples of other types of broadcast media includes, but is not limited to, Fiber Distributed Data Interface (FDDI) and Token Ring. In one embodiment, network 100 transmits data traffic among the different network elements employing the Synchronous Optical Network ("SONET") standard or Synchronous Digital Hierarchy ("SDH"). However, embodiments of the present invention are not so limited, as data traffic among the different network elements can be transferred using other types of transmission standards. Examples of other types of transmission standards can include, but are not limited to, T1, T3, Data Signal ("DS")3, and DS1 signals.

The architecture and configuration of network 100 is by way of example and not by way of limitation, as embodiments of the present invention can be incorporated in other types of systems. For example, other such systems could incorporate less or more network elements into the network and/or network elements attached thereto. Further, a different configuration of the network elements could exist. Moreover, embodiments of the system in which the present invention is implemented are not limited to the network architecture as illustrated in FIG. 1. Examples of other types of network architectures that can incorporate embodiments of the system in which the present invention is implemented include, but are not limited to, a point-to-point configuration (see discussion of FIG. 5 below), point-to-multi-point configuration, and a hub configuration.

Network Element Description

Figure 2:
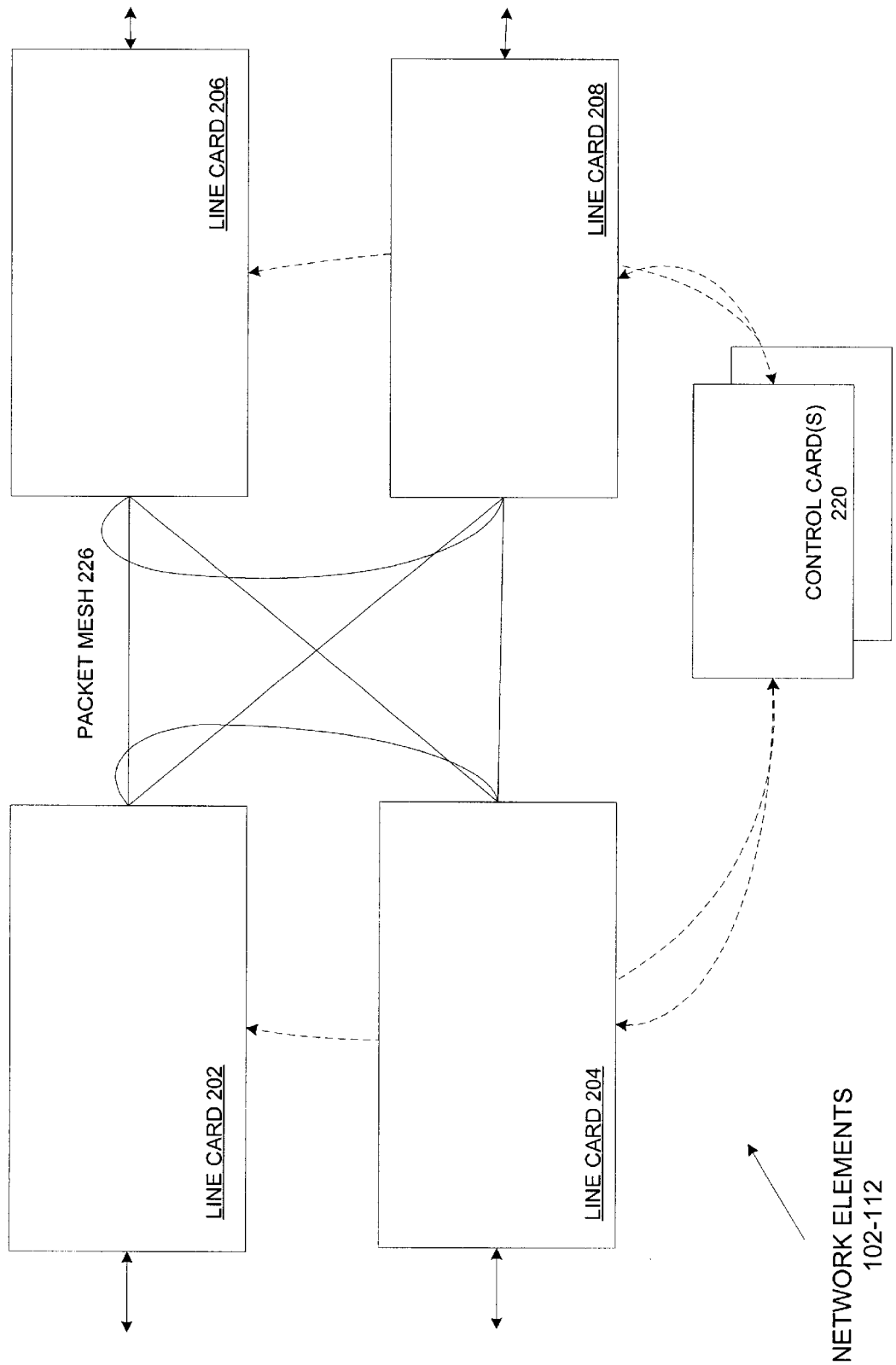
FIG. 2 illustrates portions of network elements 102–112, according to embodiments of the present invention.

FIG. 2 illustrates portions of network elements 102–112, according to embodiments of the present invention. As shown, network elements 102–112 (hereinafter, "network element 102") include line cards 202, 204, 206, and 208, control card 220, and packet mesh 210. For example, line card 202 is coupled to line card 204 through packet mesh 210. In one embodiment, packet mesh 210 is a switch fabric, which includes a full mesh such that each of line cards 202–208 is coupled to one another. However, embodiments of the present invention are not limited to a fall mesh for the transmission of data among line cards 202–208, as any type of switching method that switches based on an addressing scheme can be incorporated into embodiments of the present invention. The number of contents and connections of network element 102 illustrated are for the purpose of simplicity and not by way of limitation, as a greater or lesser number of contents or connections may be present within network element 102.

Control card 220 is coupled to exchange data with each of line cards 202–208. Each of line cards 202–208 is coupled to receive and transmit data. In one embodiment, line cards 202–208 may be connected to an optical line transmitting SONET OC-N signals. Moreover, in an embodiment, line cards 202–208 may be connected to an electrical line such as a T1, T3, E1, E3, Ethernet, Gigabit Ethernet, etc. However, embodiments of the present invention are not limited to the above-described examples, as any other type of optical or electrical data transmission can be incorporated into embodiments of the present invention.

Figure 3:
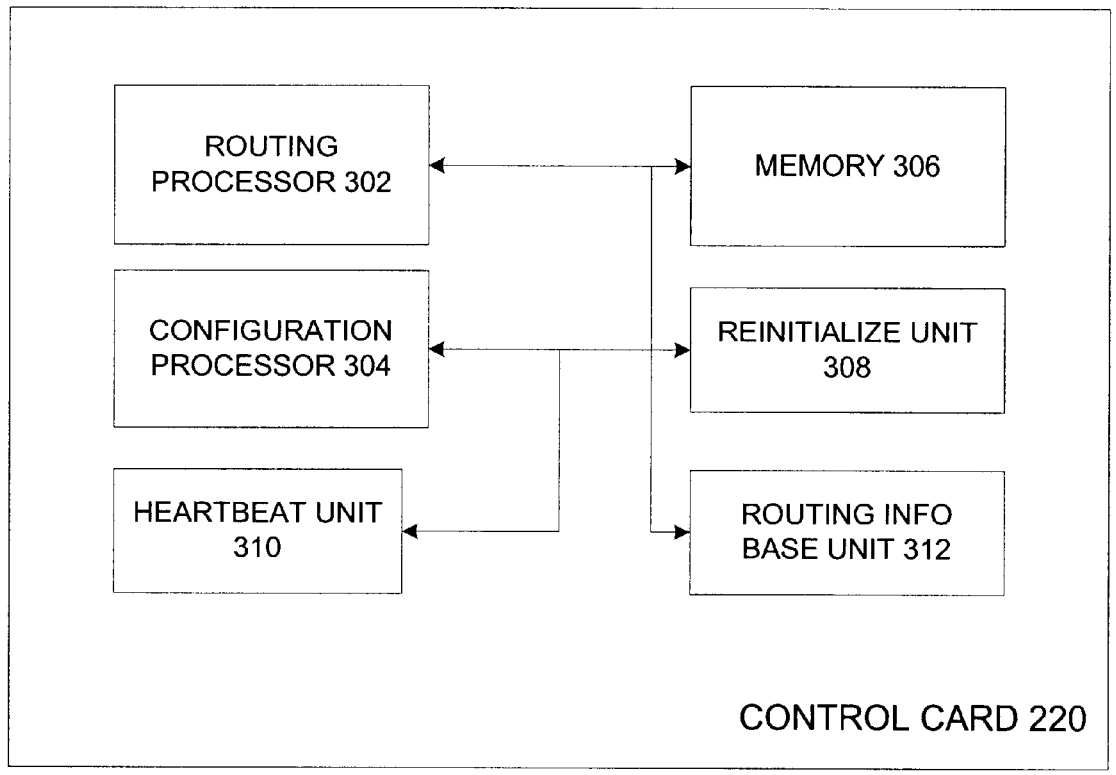
FIG. 3 is a block diagram illustrating portions of control card 220, according to embodiments of the present invention.

FIG. 3 is a block diagram illustrating portions of control card 220, according to embodiments of the present invention. In particular, FIG. 3 illustrates control card 220, which includes routing processor 302, configuration processor 304, memory 306, reinitialize unit 308, heartbeat unit 310 and routing information base unit 312, which are coupled together, In one embodiment, memory 306 is random access memory ("RAM"). Additionally, in an embodiment, reinitialize unit 308, heartbeat unit 310 and routing information base unit 312 can be processes that can reside within memory 306 and/or routing processor 302 and can be executed within routing processor 302 and configuration processor 304. However, embodiments of the present invention are not so limited, as reinitialize unit 308, heartbeat unit 310 and routing information base unit 312 can be different types of hardware (such as digital logic) executing the processing described therein. The configuration illustrated by FIG. 3 is by way of example and not by way of limitation. For example, in another embodiment, routing processor 302 and configuration processor 304 each have their own memory.

Operation of Network Elements 102–112 in a Broadcast Network Configuration

Figure 4:
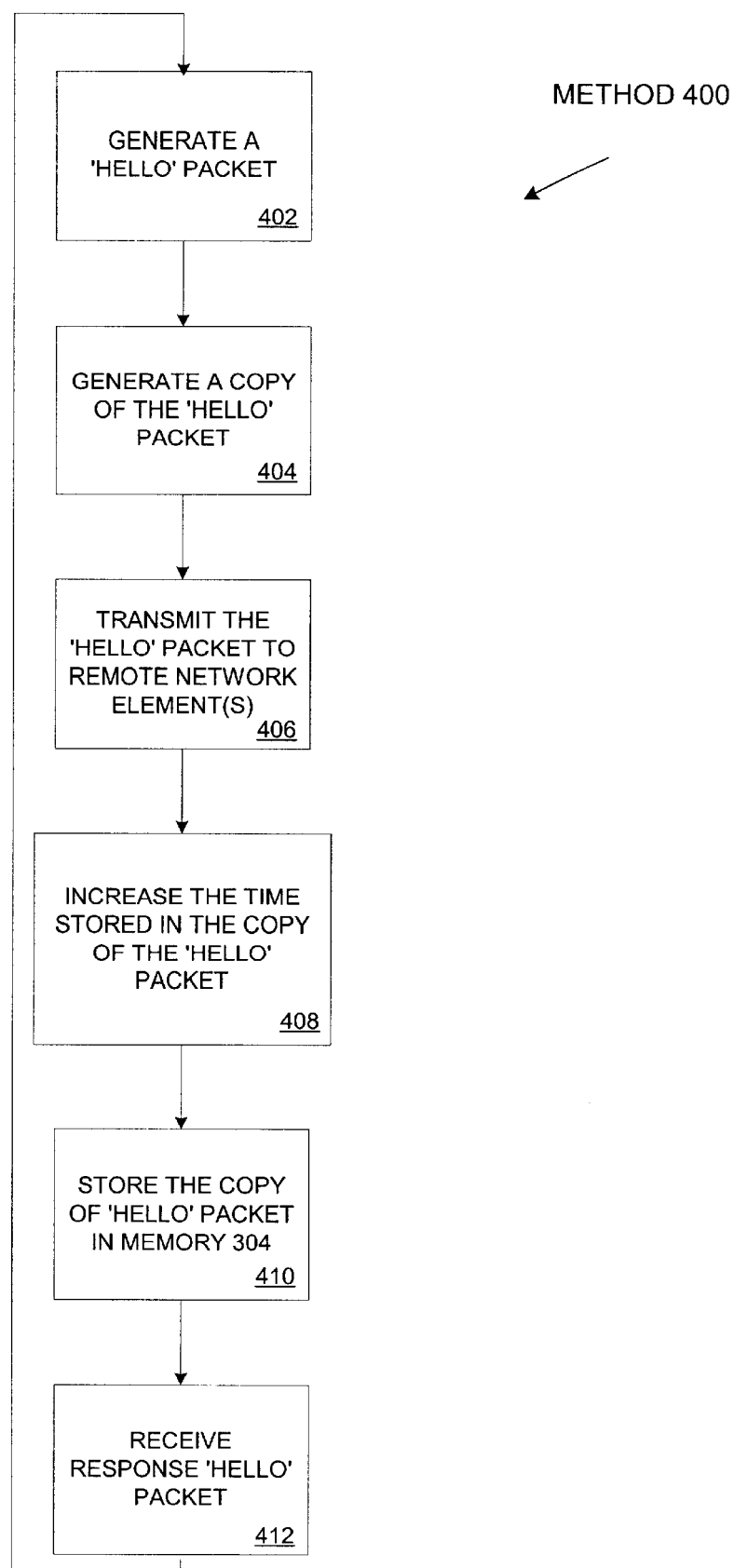
FIG. 4 illustrates a flow diagram for maintaining communication between network elements, according to embodiments of the present invention.

FIG. 4 illustrates a flow diagram for maintaining communication between network elements, according to embodiments of the present invention. Returning to FIG. 1 to help illustrate, the flow diagram of FIG. 4 will be described in terms of maintaining communications between network element 102 (acting as the transmitting network element) and network element 112 (acting as the receiving network element). Method 400 commences with the creation of a 'hello' packet by heartbeat unit 310 of network element 102, at process block 402.

These 'hello' packets act as heartbeat messages between two network elements. In particular, these packets can be sent at regular intervals by network elements to other network elements to tell the receiving network elements that the transmitting network element is still operational. In an embodiment, these 'hello' packets include a time value indicating the period of time when the receiving network element is to receive another 'hello' packet. In one such embodiment, this time value is adjustable by both or either the transmitting or receiving network element. If this next 'hello' packet is not received within the time period specified within this time value, the receiving network element tears down the communication link between itself and the transmitting network element, as the receiving network element assumes that the transmitting network element is no longer operational and therefore unable to process and route packets.

Heartbeat unit 310 of network element 102 generates a copy of the 'hello' packet, at process block 404. Additionally, heartbeat unit 310 of network element 102 transmits the 'hello' packet to network element 112, at process block 406. In one embodiment, this 'hello' packet includes a time value that has been previously configured by either network element 102 or network element 112 (known as "the default time value"). At process block 408, heartbeat unit 310 of network element 102 increases the time period stored in the default time value of the copy of the 'hello' packet. Moreover, heartbeat unit 310 of network element 102 stores the copy of the 'hello' packet with the modified time period within memory 306, at process block 410. Network element 102 will generally receive a response 'hello' packet back from network element 112, at process block 412 (assuming that the communication link between network elements 102 and 112 is still established and network elements 102 and 112 are still operational). Network element 102 continues this heartbeat messaging with network element 112 by transmitting another 'hello' packet, at process block 402.

Method 400 was described such that process blocks 404, 408 and 410 (the generation, modification and storage of a 'hello' packet) are executed each time a 'hello' packet is generated. However, this is by way of example and not by way of limitation. In other embodiments, this process blocks are executed every Nth time that a 'hello' packet is generated. For example, in one embodiment, these process blocks are executed every $10^{th}$ time that a 'hello' packet is generated.

Figure 5:
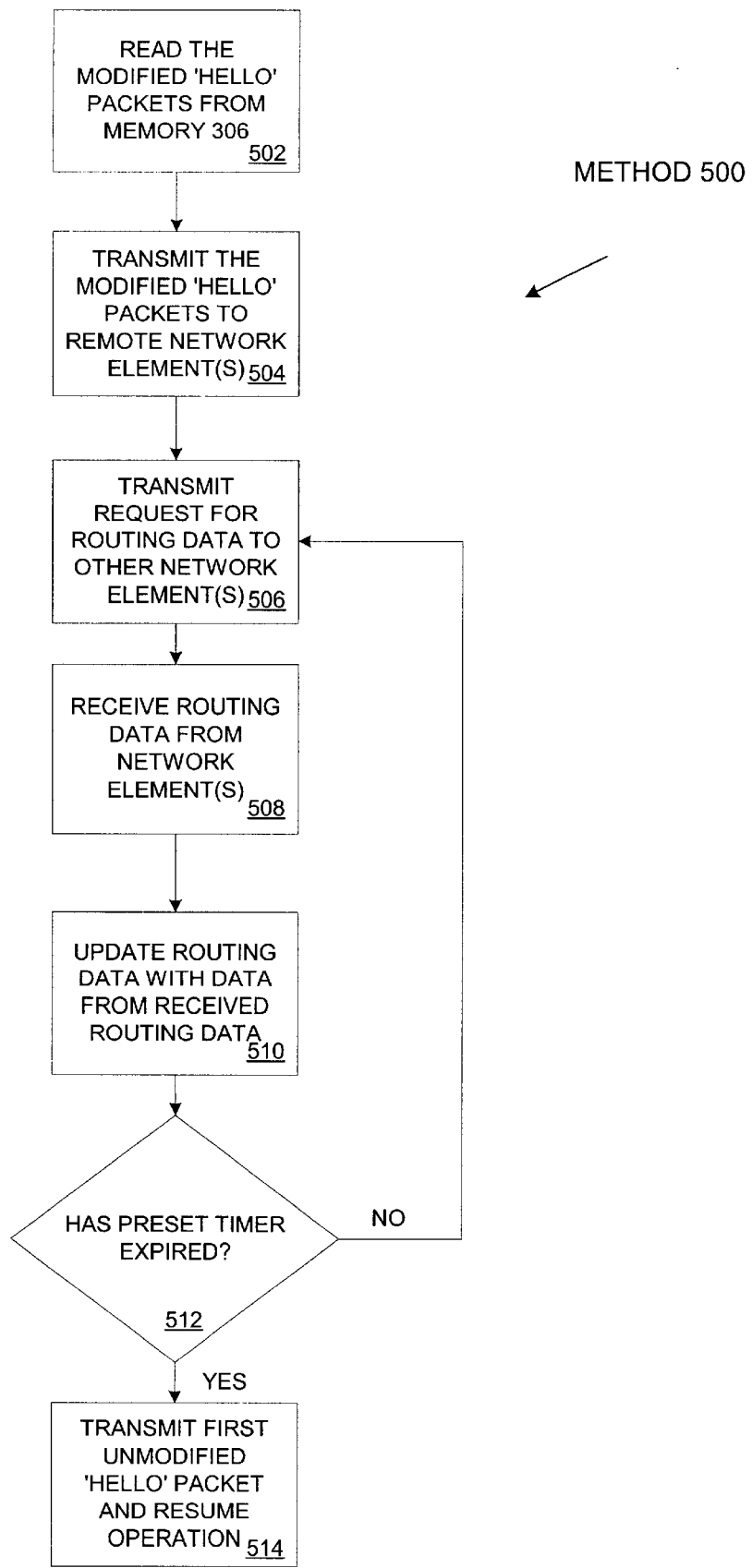
FIG. 5 illustrates a flow diagram for restart communication of a network element (that is the designated network element) in a broadcast network configuration using the IS-IS standard after the IS-IS communications of network element has been non-operational, according to embodiments of the present invention.

However, if the IS-IS communications of one of network elements 102 or 112 were to become non-operational, this messaging of 'hello' packets between the two would cease. FIG. 5 illustrates a flow diagram for restart communication of a network element (that is the designated network element) in a broadcast network configuration using the IS-IS standard after the IS-IS communications of network element has been non-operational, according to embodiments of the present invention. In particular, method 500 illustrates a flow diagram of a network element that was non-operational with regard to the IS-IS communications and is reinitializing and reestablishing communication with other network elements in the network. A designated network element is that network element within the network that acts in a management capacity for the network and the network elements coupled thereto. Examples of the type of operations of the designated network element includes, but are not limited to, distributing and storing routing information among and for the network elements in the network.

Method 500 commences with the reading of the modified 'hello' packets from memory 306 (as illustrated in FIG. 4 above) by reinitialize unit 308 of network element 102, at process block 502. Additionally, reinitialize unit 308 of network element 102 also transmits these 'hello' packets to those network elements with which network element 102 has communication links between, at process block 504. Method 500 will be described in terms of network element 102 restarting communication with one network element (network element 112). This is by way of example and not by way of limitation, as the method described is applicable for a network element attempting to restart communication with a number of network elements.

This transmission of the stored 'hello' packets, which have an increased time period, to other network elements with which there is a communication link allows the restarting network element more time to reinitialize. In particular, if the restarting network element is able to transmit a modified 'hello' packet to the receiving network element before the default time period (which was transmitted with the unmodified 'hello' packets) expires, the restarting network element is able to preclude the receiving network element from tearing down the communication link between itself and the restarting network element. Accordingly as will be described in more detail below, this delay in time allows the restarting network element to reinitialize and updates its routing information without tearing down and reconstructing the communication link as well as precluding the exchange of routing data between the two network elements after reconstruction of the communication link in order to restart communications between the restarting network elements and those network elements that it is connected. In particular, this delay in time allows the restarting network element to reinitialize, which includes waiting for all neighboring network elements to transmit 'hello' packets to itself and includes periodically sending out CSNP packets to update routing information therein.

Moreover, reinitialize unit 308 of network element 102 transmits a request for routing data to other network elements in the network, at process block 506. In an embodiment, reinitialize unit 308 of network element 102 transmits this request for routing data using the IS-IS standard. In one such embodiment, reinitialize unit 308 of network element 102 transmits a request for Link State Packets (LSPs) using CSNP packets under the IS-IS standard. In particular, LSPs can contain actual routing information for a given network element, such as what other network element(s) and/or network(s) that it is connected.

Accordingly, reinitialize unit 308 of network element 102 receives routing data from the network element(s) in the network, at process block 508. In the embodiment wherein a request for LSPs is requested, reinitialize unit 308 of network element 102 receives a number of LSPs under the IS-IS standard from the other network element(s) in the network. Upon receipt of this routing data from each of the network elements, reinitialize unit 308 of network element 102 updates its routing data with data received from the requesting network elements, at process block 510. In one embodiment, when the IS-IS communications of network element 102 became non-operational, its routing data was lost. Accordingly, reinitialize unit 308 of network element 102 begins recreating its routing data based on that received from other network elements. In an embodiment wherein the IS-IS standard is employed, network element 102 compares the routing data received from the different network elements and maintains the most up-to-date routing data based on sequence numbers for this routing data.

Upon receiving routing data from a network element, network element 102 determines whether a preset timer has expired, at process decision block 512. In an embodiment, this preset timer is activated when network element 102 is reinitialized. In one embodiment, the time for the preset timer is smaller than the time that was modified in the modified 'hello' packets. Upon determining that this preset timer has not expired, network element 102 returns to process block 506 and transmits another request for routing data to the other network elements. In contrast, upon determining that the preset timer has expired, network element 102 transmits a first unmodified 'hello' packet and resumes normal operation, at process block 514.

As illustrated, this preset timer within network element 102 allows the other network elements time to respond with the required routing data prior to resuming operation. Accordingly, upon resuming operation when IS-IS based messaging resumes among network element 102 and the other network elements in the network, the other network elements do not know that the IS-IS communications of network element 102 has been non-operational. The other network elements, therefore, will not destroy and recreate the communication link between themselves and network element 102. Moreover, there is no requirement that the other network elements exchange their routing data with network element 102 after the reconstruction of the communication link. Accordingly, the data packets that can be transmitted across the communication links between network element 102 and the other network elements will not have to be re-routed or lost during the time when the communication link is destroyed and reconstructed and when the routing data is exchanged between the other network elements and network element 102.

Figure 6:
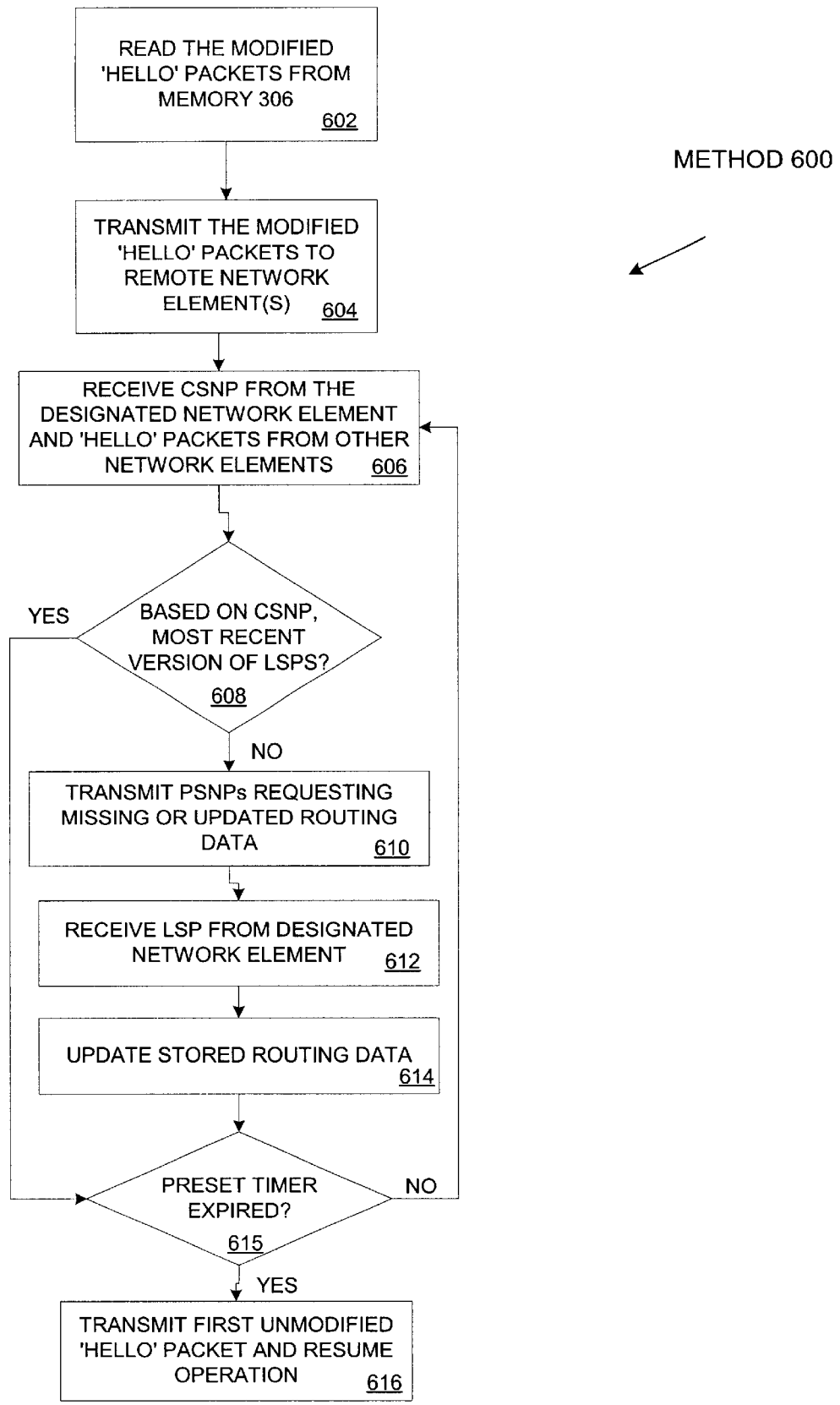
FIG. 6 illustrates a flow diagram for restart communication of a network element (that is not the designated network element) in a broadcast network configuration using the IS-IS standard after the IS-IS communications of the network element has been non-operational, according to embodiments of the present invention.

FIG. 6 illustrates a flow diagram for restart communication of a network element (that is not the designated network element) in a broadcast network configuration using the IS-IS standard after the IS-IS communications of the network element have been non-operational, according to embodiments of the present invention. In particular, method 600 illustrates a flow diagram of a network element whose IS-IS communications were non-operational and is reinitializing and reestablishing communication with other network elements in the network.

Method 600 commences with the reading of the modified 'hello' packets from memory 306 (as illustrated in FIG. 4 above) by reinitialize unit 308 within network element 102, at process block 602. Additionally, reinitialize unit 308 also transmits these 'hello' packets to those network elements with which network element 102 has communication links between, at process block 604 (as described above in conjunction with FIG. 5). Reinitialize unit 308 also receives Complete Sequence Number Packets (CSNPs) under the IS-IS standard from the designated network element and receives 'hello' packets from other network elements in the network, at process block 606. CSNPs include sequence numbers related to the routing information of the network such that given sequence numbers correspond to portions of the network, such as the connectivity of a given network element to other network elements in the network. In particular, in one embodiment, the designated network element periodically transmits these CSNPs to the other network elements. Accordingly, network element 102 can wait and receive the CSNPs.

Based on the received CSNPs, reinitialize unit 308 determines whether it has the most recent version of the LSPs, at process decision block 608. In particular, a given sequence number within the CSNPs and/or stored within network element 102 is associated within given routing data. For example, a given sequence number could be associated with the routing and connectivity of network element 110.

Upon determining that network element 102 has the most recent version of the LSPs, reinitialize unit 308 determines whether the preset timer within network element 102 has expired (which is described above in conjunction with process decision block 512 of FIG. 5). In contrast, upon determining that network element 102 does not have the most recent version of the LSPs, reinitialize unit 308 transmits Partial Sequence Number Packets (PSNPs) for those sequence numbers that are different, at process block 610. In an embodiment, PSNPs include those sequence numbers for the routing information for one particular network element. Reinitialize unit 308 also requests PSNPs for routing data that is not included in network element 102. For example, a new network element could have been installed while the IS-IS communications of network element 102 were non-operational. Accordingly, network element 102 would not be aware or have any routing data associated with this new network element.

Additionally, reinitialize unit 308 receives LSPs from the designated network element for those PSNP packets that were transmitted, at process block 612. Reinitialize unit 308 updates the routing data stored within network element 102, at process block 614. Upon storing the updated routing data, reinitialize unit 308 determines whether a preset timer has expired, at process decision block 615, as described above in conjunction with process decision block 512 of FIG. 5.

Upon determining that this preset timer has not expired, reinitialize unit 308 returns to process block 606 and waits to receive CSNPs and 'hello' packets from the designated network element and the other network elements, respectively. In contrast, upon determining that the preset timer has expired, reinitialize unit 308 transmits a first unmodified 'hello' packet and resumes normal operation, at process block 616.

Similar to when network element 102 is the designated network element (illustrated by FIG. 5), this preset timer within network element 102 allows the other network elements and the designated network element time to respond with the required routing data prior to resuming operation. Accordingly, upon resuming normal operation when IS-IS based messaging resumes among network element 102 and the other network elements in the network, the other network elements do not know that the IS-IS communications of network element 102 have been non-operational. The other network elements, therefore, will not destroy and recreate the communication link between themselves and network element 102. Moreover, there is no requirement that the other network elements exchange their routing data with network element 102 after the reconstruction of the communication link. Accordingly, the data packets that can be transmitted across the communication links between network element 102 and the other network elements will not have to be re-routed or lost during the time when the communication link is destroyed and reconstructed and when the routing data is exchanged between the other network elements and network element 102.

Operation of Network Elements in a Point-to-point Network Configuration

Figure 7:
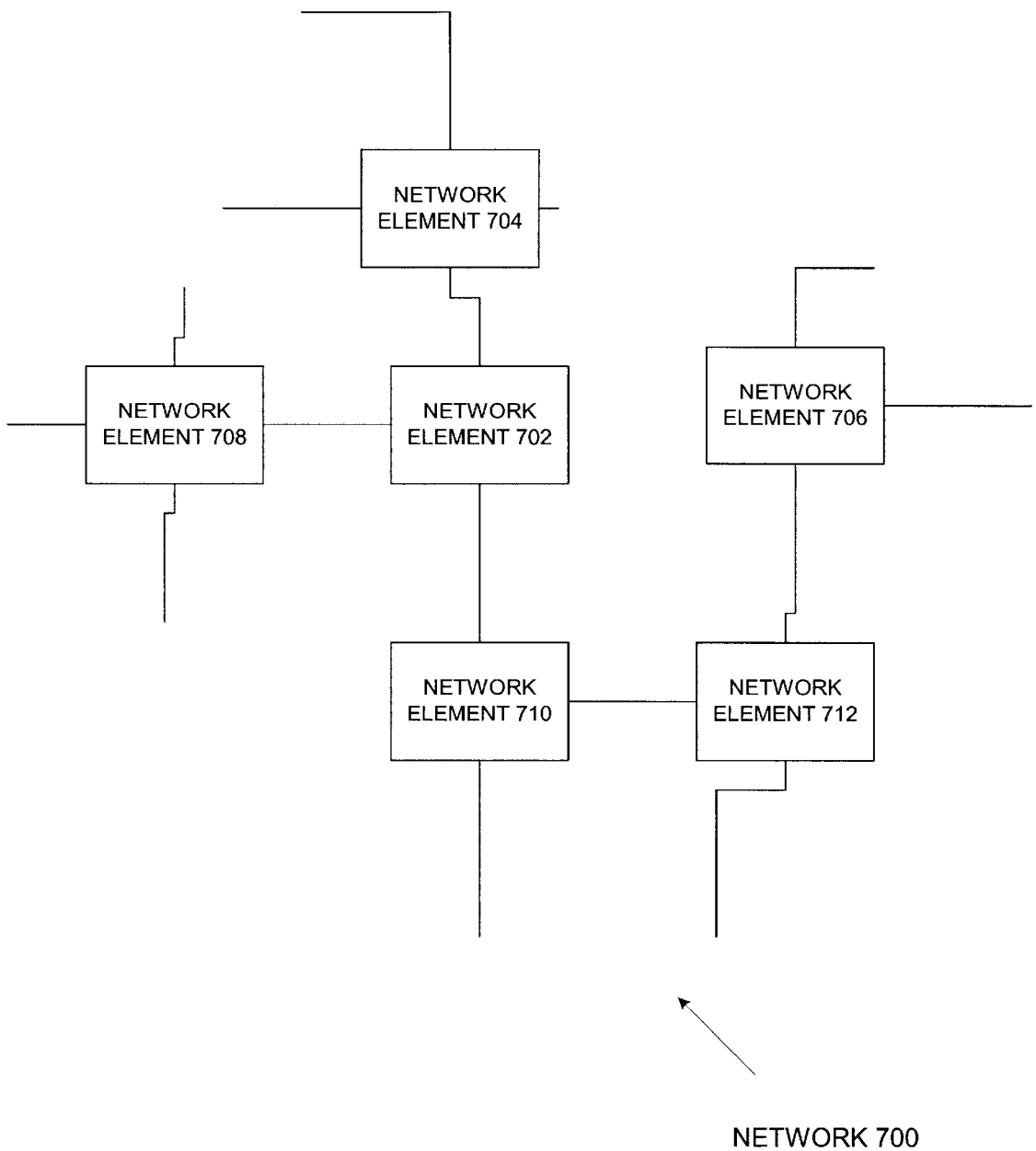
FIG. 7 is a block diagram illustrating an embodiment of a point-to-point network configuration that incorporates embodiments of the present invention.

FIG. 7 is a block diagram illustrating an embodiment of a point-to-point network configuration that incorporates embodiments of the present invention. In particular, FIG. 7 illustrates network 700 that includes network element 702, network element 704, network element 706, network element 708, network element 710, and network element 712, such that network elements 702–712 are coupled together in a point-to-point network configuration, according to embodiments of the present invention. Specifically, network element 702 is coupled to network elements 704–710, and network element 712 is coupled to network elements 704 and 706. In an embodiment, network elements 702–712 can be routers, switches, bridges, or other types of network elements that switch data across a network. In another embodiment, network 700 is a system in which network elements 702–712 share routing information using the IS-IS standard. In a further embodiment, network elements 702–712 are coupled to other network elements that may be part of other networks.

In an embodiment, network 700 transmits data traffic among the different network elements employing the SONET standard or SDH. However, embodiments of the system in which the present invention is implemented are not so limited, as data traffic among the different network elements can be transferred using other types of transmission standards. Examples of other types of transmission standards can include, but are not limited to, T1, T3, DS3, and DS1 signals.

The architecture and configuration of network 700 is by way of example and not by way of limitation, as embodiments of the present invention can be incorporated in other types of systems. For example, other such systems could incorporate less or more network elements into the network and/or network elements attached thereto. Further, a different configuration of the network elements could exist. Moreover, embodiments of the system in which the present invention is implemented are not limited to the network architecture as illustrated in FIG. 7.

Figure 8:
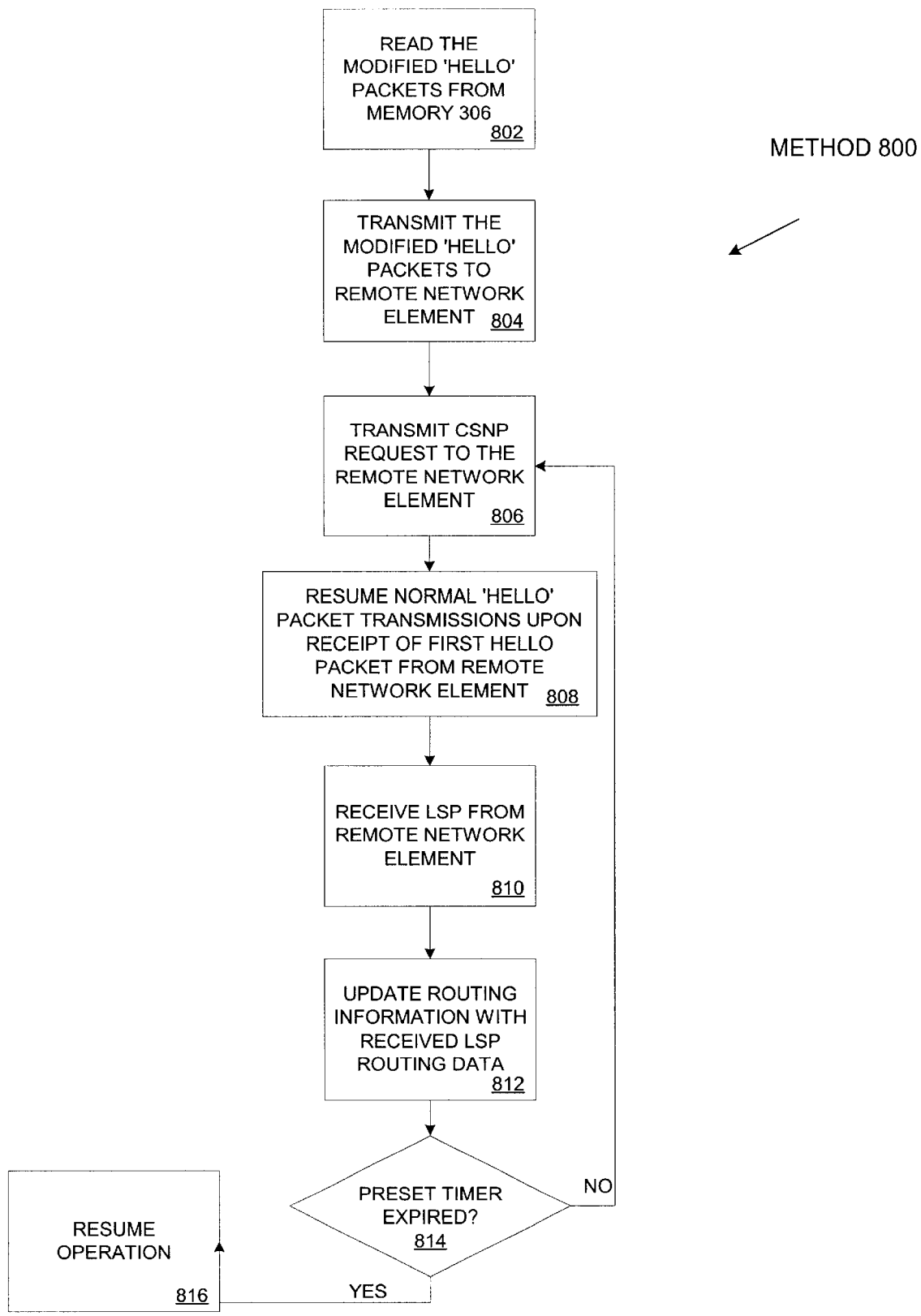
FIG. 8 illustrates a flow diagram for restart communication of a network element in a point-to-point network configuration using the IS-IS standard after the IS-IS communications of the network element has been non-operational, according to embodiments of the present invention.

FIG. 8 illustrates a flow diagram for restart communication of a network element in a point-to-point network configuration using the IS-IS standard after the IS-IS communications of the network element have been non-operational, according to embodiments of the present invention. In particular, method 800 illustrates a flow diagram of a network element whose IS-IS communications were non-operational and is reinitializing and reestablishing communication with other network elements in the network. Returning to FIG. 7 to help illustrate, the flow diagram of FIG. 8 will be described in terms of restarting communications between network element 702 (acting as the reinitializing network element) and network element 708 (acting as a remote network element) in network 700.

Method 800 commences with the reading of the modified 'hello' packets from memory 306 (as illustrated in FIG. 4 above) by reinitialize unit 308 within network element 702, at process block 802. Additionally, reinitialize unit 308 also transmits the 'hello' packets, whose unmodified versions were previously transmitted to the remote network element, at process block 604 (as described above in conjunction with FIG. 5).

Similar to embodiments of the broadcast network configuration, this transmission of the stored 'hello' packets, which have an increased time period, to other network elements with which there is a communication link allows the reinitializing network element more time to reinitialize. In particular, if the reinitializing network element is able to transmit a modified 'hello' packet to the receiving network element before the default time period (which was transmitted with the unmodified 'hello' packets) expires, the reinitializing network element is able to preclude the remote network element from tearing down the communication link between itself and the reinitializing network element. Accordingly as will be described in more detail below, this delay in time allows the restarting network element to reinitialize and updates its routing information without tearing down and reconstructing the communication link as well as exchange routing data between the two network elements in order to restart communications between the restarting network elements and those network elements that it is connected.

Additionally, reinitialize unit 308 of network element 702 transmits CSNP packets to the remote network element, at process block 806. In an embodiment of a point-to-point network configuration, each network element must include routing data for all of the network elements in the network. Upon receipt of a first hello packet from the remote network element, reinitialize unit 308 of network element 702 resumes normal 'hello' packet transmissions to the remote network element, at process block 808.

Reinitialize unit 308 of network element 702 also can receive LSP from the remote network element if its routing data is out-of-date, at process block 810. Additionally, reinitialize unit 308 of network element 702 updates the routing information stored within network element 702 based on the routing data received from the LSPs, at process block 812. Upon updating the routing data, reinitialize unit 308 determines whether a preset timer has expired, at process decision block 814, as described above in conjunction with process decision block 512 of FIG. 5. Upon determining that this preset timer has not expired, reinitialize unit 308 returns to process block 806 and transmits CSNPs to the remote network element. In contrast, upon determining that the preset timer has expired, reinitialize unit 308 resumes normal operation, at process block 816.

Similar to the reinitializing network element within a broadcast network configuration, this preset timer within network element 702 allows the remote network element to respond with 'hello' packets. Accordingly, upon resuming operation when IS-IS based messaging resumes between network element 702 and network element 708 (the remote network element), network element 708 does not know that the IS-IS communications of network element 702 have been non-operational. This remote network element, therefore, will not destroy and recreate the communication link between itself and network element 702. Moreover, there is no requirement that the remote network elements exchange their routing data with network element 702 after reconstruction of the communication link. Accordingly, the data packets that can be transmitted across the communication links between network element 702 and the remote network element will not have to be re-routed or lost during the time when the communication link is destroyed and reconstructed and when the routing data is exchanged between the remote network element and network element 702.

Figure 9:
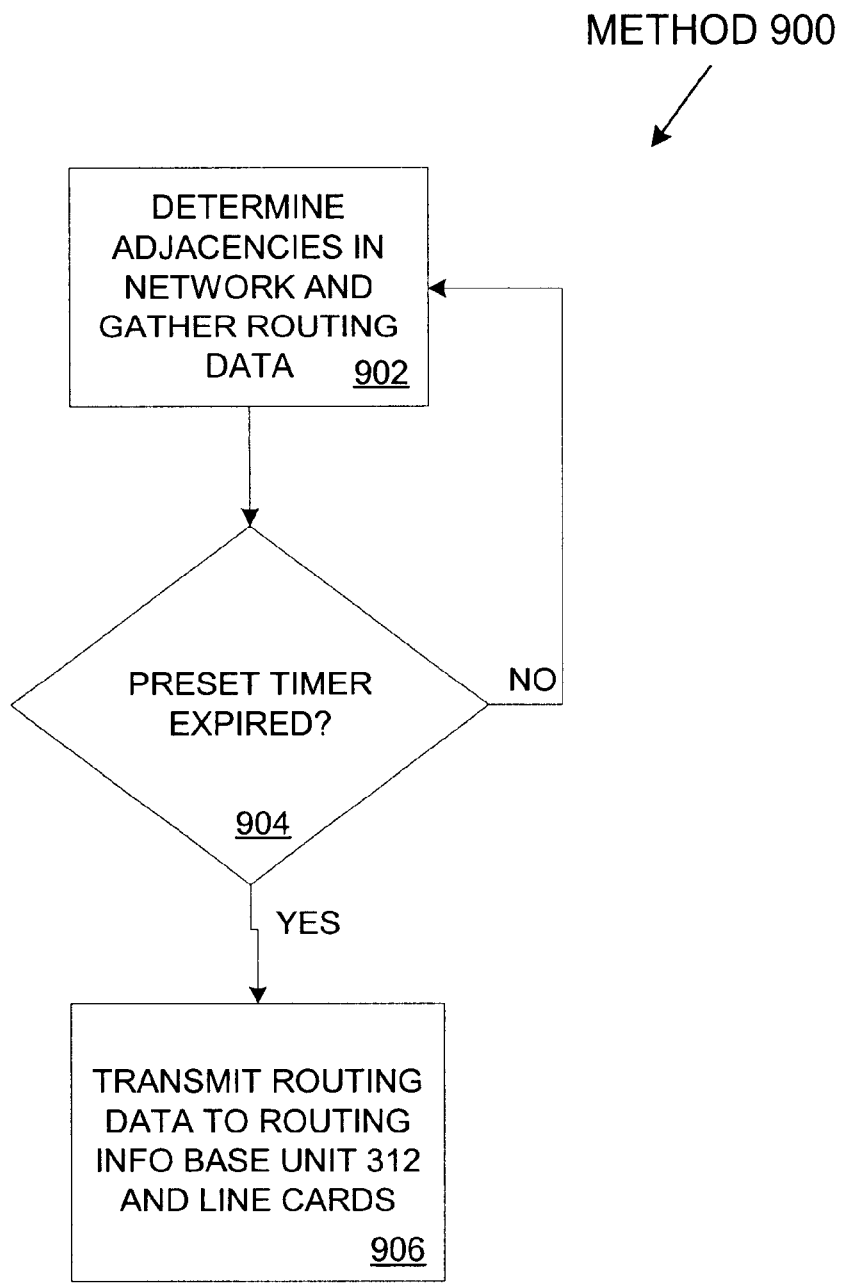
FIG. 9 illustrates a flow diagram for updating routing information within a network element, according to embodiments of the present invention.

FIG. 9 illustrates a flow diagram for updating routing information within a network element, according to embodiments of the present invention. In particular, method 900 illustrates the updating of routing information within a network element as part of the reinitialization after the IS-IS communications have become non-operational. Additionally, method 900 of FIG. 9 can be employed in a network element within both a broadcast and point-to-point network configuration, as illustrated in FIGS. 1 and 7 above.

Method 900 commences with determining adjacencies within the network as well as the gathering of routing data, by reinitialize unit 308, at process block 902. As described above, other network elements including the designated network element (in a broadcast configuration), the remote network element (in a point-to-point configuration) as well as other network elements in the network communicate routing data to network element 102. Accordingly, reinitialize unit 308 determines the network configuration based on this routing data. Additionally, reinitialize unit 308 determines whether the preset timer has expired, at process decision block 904, as described above in conjunction with process decision block 512 of FIG. 5.

Upon determining that the preset timer has not expired, reinitialize unit 308 continues determining adjacencies within the network as well as the gathering of routing data, at process block 902. In contrast, upon determining that the preset timer has expired, reinitialize unit 308 transmits this updated routing data to routing information base unit 312. In turn, routing information base unit 312 downloads this routing data to the relevant units on the line cards of the network element, at process block 906. In an embodiment, reinitialize unit 308 determines routing information using the Short Path First algorithm. As shown by method 900, network element 102 waits to update its routing data information until the preset timer has expired, thereby having received all of the routing data from the relevant network elements in the network.

The line cards and control cards included in the different network elements include memories, processors, and/or Application Specific Integrated Circuits ("ASICs"). Such memory includes a machine-readable medium on which is stored a set of instructions (i.e., software) embodying any one, or all, of the methodologies described herein. Software can reside, completely or at least partially, within this memory and/or within the processor and/or ASICs. For the purposes of this specification, the term "machine-readable medium" shall be taken to include any mechanism that provides (i.e., stores and/or transmits) information in a form readable by a machine (e.g., a computer). For example, a machine-readable medium includes read only memory ("ROM"), random access memory ("RAM"), magnetic disk storage media; optical storage media, flash memory devices, electrical, optical, acoustical, or other form of propagated signals (e.g., carrier waves, infrared signals, digital signals, etc.), etc.

Thus, a method and apparatus for the restart communication between network elements have been described. Although the present invention has been described with reference to specific exemplary embodiments, it will be evident that various modifications and changes may be made to these embodiments without departing from the broader spirit and scope of the invention. For example, different network configurations using the IS-IS standard for sharing routing information are possible. Accordingly, the specification and drawings are to be regarded in an illustrative rather than a restrictive sense.

What is claimed is:

1. A method for restarting communication between a transmitting network element and a number of receiving network elements in a network, the method comprising:

generating, by the transmitting network element, a hello packet, the hello packet to include a time value, the time value to indicate when hello packets that are transmitted by the transmitting network element are to be received by the number of receiving network elements;

generating, by the transmitting network element, a copy of the hello packet;

increasing, by the transmitting network element, the time value in the copy of the hello packet;

storing, by the transmitting network element, the copy of the hello packet in a local memory; and transmitting, by the transmitting network element, the copy of the hello packet to the number of receiving network elements when the transmitting network element is reinitializing after International-System-International-System (IS-IS) network communications in the transmitting network element have been non-operational.

2. The method of claim 1, wherein the network includes a broadcast network configuration.

3. The method of claim 2, further comprising:

upon determining that the transmitting network element is a designated network element for the network, performing the following until a preset timer has expired:

transmitting a request for routing data using a Link State Packet (LSP) under the International-System-International-System (IS-IS) standard to the number of receiving network elements;

receiving routing data from the number of receiving network elements; and updating routing data within the transmitting network element based on the received routing data; and resuming operation upon determining that the preset timer has expired.

4. The method of claim 1, wherein the network includes a point-to-point configuration.

5. A machine-readable medium that provides instructions for restarting communication between a transmitting network element and a number of receiving network elements in a network, which when executed by a machine, causes the machine to perform operations comprising:

generating, by the transmitting network element, a hello packet, the hello packet to include a time value, the time value to indicate when hello packets that are transmitted by the transmitting network element are to be received by the number of receiving network elements;

generating, by the transmitting network element, a copy of the hello packet;

increasing, by the transmitting network element, the time value in the copy of the hello packet;

storing, by the transmitting network element, the copy of the hello packet in a local memory; and transmitting, by the transmitting network element, the copy of the hello packet to the number of receiving network elements when the transmitting network element is reinitializing after International-System-International-System (IS-IS) network communications in the transmitting network element have been non-operational.

6. The machine-readable medium of claim 5, wherein the network includes a broadcast network configuration.

7. The machine-readable medium of claim 6, further comprising:

upon determining that the transmitting network element is a designated network element for the network, performing the following until a preset timer has expired:
   transmitting a request for routing data using a Link State Packet (LSP) under the International-System-International-System (IS-IS) standard to the number of receiving network elements;
   receiving routing data from the number of receiving network elements; and
   updating routing data within the transmitting network element based on the received routing data; and
resuming operation upon determining that the preset timer has expired.

8. The machine-readable medium of claim 7 wherein the network includes a point-to-point configuration.

9. A network element comprising:
   a control card including
      a heartbeat unit, the heartbeat unit having stored thereon a set of instructions for restarting communication between the network element and a receiving network element, the set of instructions to cause the heartbeat unit to,
         generate a hello packet, the hello packet to include a time value, the time value to indicate when hello packets that are transmitted by the network element are to be received by the receiving network element,
         generate a copy of the hello packet,
         increase the time value in the copy of the hello packet;
      a memory coupled with the heartbeat unit, the memory to host the copy of the hello packet; and
   a plurality of line cards coupled with the control card, at least one of the plurality of line cards to transmit the copy of the hello packet to the receiving network element when the network element is reinitializing after International-System-International-System (IS-IS) network communications in the network element have been non-operational.

10. The network device of claim 9 wherein the control card further has a configuration processor.

11. The network device of claim 9 wherein the control card further has a routing processor.

12. The network device of claim 9 further comprising a reinitialize unit.

13. A network comprising:
   a set of one or more receiving network elements; and
   a transmitting network element having
      a control card that performs operations to restart communications between the transmitting network element and at least one of the set of receiving network elements including,
         generating a hello packet, the hello packet to include a time value, the time value to indicate when hello packets that are transmitted by the transmitting network element are to be received by the set of receiving network elements,
         generating a copy of the hello packet,
         increasing the time value in the copy of the hello packet;
      a memory coupled with the control card, the memory having stored therein the copy of the hello packet; and
      a plurality of line cards coupled with the control card, at least one of the plurality of Line cards transmitting the copy of the hello packet to at least one of the set of receiving network elements when the transmitting network element is reinitializing after International-System-International-System (IS-IS) network communications in the transmitting network element have been non-operational.

14. The network of claim 13 wherein the control card of the transmitting network element includes a heartbeat unit that performs the operations to restart communications.

15. The network of claim 13 wherein the network is in a broadcast configuration.

16. The network of claim 13 wherein the network includes a point-to-point configuration.

* * * * *